United States Patent [19]

Takago

[11] 4,291,144
[45] Sep. 22, 1981

[54] EPOXY-BASED CURABLE COMPOSITIONS

[75] Inventor: Toshio Takago, Annaka, Japan

[73] Assignee: Shin-Etsu Chemical Co., Ltd., Tokyo, Japan

[21] Appl. No.: 119,114

[22] Filed: Feb. 6, 1980

[30] Foreign Application Priority Data

Feb. 15, 1979 [JP] Japan ................................ 54-16502

[51] Int. Cl.$^3$ ............................................ C08G 77/04
[52] U.S. Cl. ..................................... 528/26; 525/476;
525/523; 525/529; 528/27; 528/32
[58] Field of Search ............................ 528/27, 26, 32;
525/476, 523, 529

[56] References Cited

U.S. PATENT DOCUMENTS

| | | | |
|---|---|---|---|
| 3,131,161 | 4/1964 | Nitzsche et al. | 525/476 |
| 3,380,941 | 4/1968 | Dittman et al. | 525/476 |
| 4,081,421 | 3/1978 | Yoshida et al. | 525/476 |

Primary Examiner—Melvyn I. Marquis
Attorney, Agent, or Firm—Toren, McGeady and Stanger

[57] ABSTRACT

The invention provides a novel epoxy-based resin composition which is storable as ready-mixed in one package in a sealed condition for a long time of period and yet is curable when exposed to the atmospheric air without heating by the action of the moisture contained in the atmospheric air to exhibit very strong adhesive bonding to various kinds of substrate materials. The inventive composition comprises (a) an epoxy compound having at least two epoxy groups in a molecule, (b) a curing agent for the epoxy compound, and (c) an organosilicon compound, in particular, an organosilane compound or an organopolysiloxane, having, in a molecule, at least one group represented by the general formula

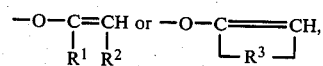

where $R^1$ and $R^2$ are each a hydrogen atom or a monovalent hydrocarbon group and $R^3$ is a divalent hydrocarbon group, directly bonded to the silicon atom. The component (c) reacts with the component (b) when blended together to mask the activity of the curing agent but readily regenerate an active curing agent when reacted by the moisture in the atmospheric air even at room temperature effecting curing of the epoxy resin composition.

7 Claims, No Drawings

EPOXY-BASED CURABLE COMPOSITIONS

BACKGROUND OF THE INVENTION

The present invention relates to an epoxy-based curable composition or, more particularly, to a room temperature curable epoxy-based composition having improved curability and adhesivity as well as improved stability when stored in one package as ready-mixed.

As is well known, epoxy resins are excellent in mechanical strengths, adhesivity on to various substrate materials including metals, ceramics, masonry materials and the like and chemical stability against alkalis as well as in the very small shrinkage by curing so that they are widely used in a wide variety of application fields such as adhesive agents or as a binder resin combined with certain reinforcing materials such as glass fibers, powdery fillers and the like to give reinforced composite resinous materials to be used in various kinds of electric instruments or machinery.

One of the problems in the epoxy resins in the prior art is, however, that a curable epoxy resin composition is obtained only by blending two components, which are stored separately in two packages, directly before use or, in other words, the epoxy resins are of two-package type so that troublesome procedures of weighing, admixing and blending of the components are always indispensable in addition to the problem that a relatively long time is required for complete curing of the thus prepared resin compositions.

Accordingly, various attempts have been made recently to solve the above described problems in the prior art epoxy resins in the direction of obtaining a so-called one-package type epoxy resin composition which is storable as ready-mixed in one package. The one-package type epoxy resin compositions of the prior art utilize in principle a latent curing agent which exhibits curing activity only when it is heated in the composition as exemplified by complex compounds of boron and an amine, dicyandiamide, ketimine compounds, boron trifluorideamine complex compounds and the like. It is of course necessary that such an epoxy resin composition must be heated at an elevated temperature to be cured sufficiently rapidly taking a considerably long time of heating. In addition, most of the above named latent curing agents produce poisonous or corrosive gases with unpleasant odor by heating so that a sufficiently powerful ventilation unit is required in order to keep healthly working environments. Further, the corrosive decomposition products of the curing agents cause rusting of metals when the epoxy resin composition is applied on to the surface of a metal surface so that it is indispensable that the metal substrate must be treated in advance with a primer.

SUMMARY OF THE INVENTION

It is therefore an object of the present invention to provide a novel epoxy resin composition which is storable in one package as ready mixed but yet curable easily when it is exposed to atmospheric air without heating so that the above described drawbacks in the prior art curable epoxy resin compositions are completely eliminated.

The room temperature-curable epoxy resin composition of the present invention comprises (a) an epoxy compound having at least two epoxy groups in a molecule,
(b) a curing agent, and
(c) an organosilicon compound having, in a molecule, at least one group represented by the general formula.

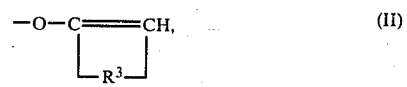

where $R^1$ and $R^2$ are each a hydrogen atom or a monovalent hydrocarbon group and $R^3$ is a divalent hydrocarbon group, directly bonded to the silicon atom.

The inventive epoxy resin composition comprising the above given components (a) to (c) is storable for a long period of time when it is kept in a sealed condition despite the presence of the curing agent in the composition. Nevertheless, the composition is readily curable when exposed to the atmospheric air or applied on to the surface of a substrate by the action of the moisture in the air or the moisture contained in the substrate material to give a cured product having high mechanical strengths and strong adhesion to the substrate surface. Furthermore, the decomposition product liberated from the inventive epoxy resin composition during the curing procedure thereof is only a ketone or an aldehyde compound exhibiting not only no retarding effect on the proceeding of the curing reaction but also no corrosiveness to metals.

DETAILED DESCRIPTION OF THE PREFERRED EMBODIMENTS

In the following, the room temperature-curable epoxy resin composition of the present invention is described in further detail.

The component (a) which is the main ingredient in the inventive composition is an epoxy compound having at least two epoxy groups in a molecule exemplified by those compounds known in the prior art such as glycidyl ether compounds, glycidyl ether ester compounds, glycidyl amine compounds, linear aliphatic epoxy compounds, alicyclic epoxy compounds and the like. The most preferred epoxy compounds among the above named compounds are those having at least two epoxy groups in a molecule selected from the group consisting of glycidyl ether compounds, glycidyl ester compounds and glycidyl amine compounds.

Particular examples of the preferred epoxy compounds are those expressed by the following structural formulas. In the following formulas, R and R' each represents a monovalent hydrocarbon group and n is a positive integer. In addition to the compounds expressed by these formulas, epoxidated fatty oils such as an epoxidated soybean oil are also suitable as the component (a).

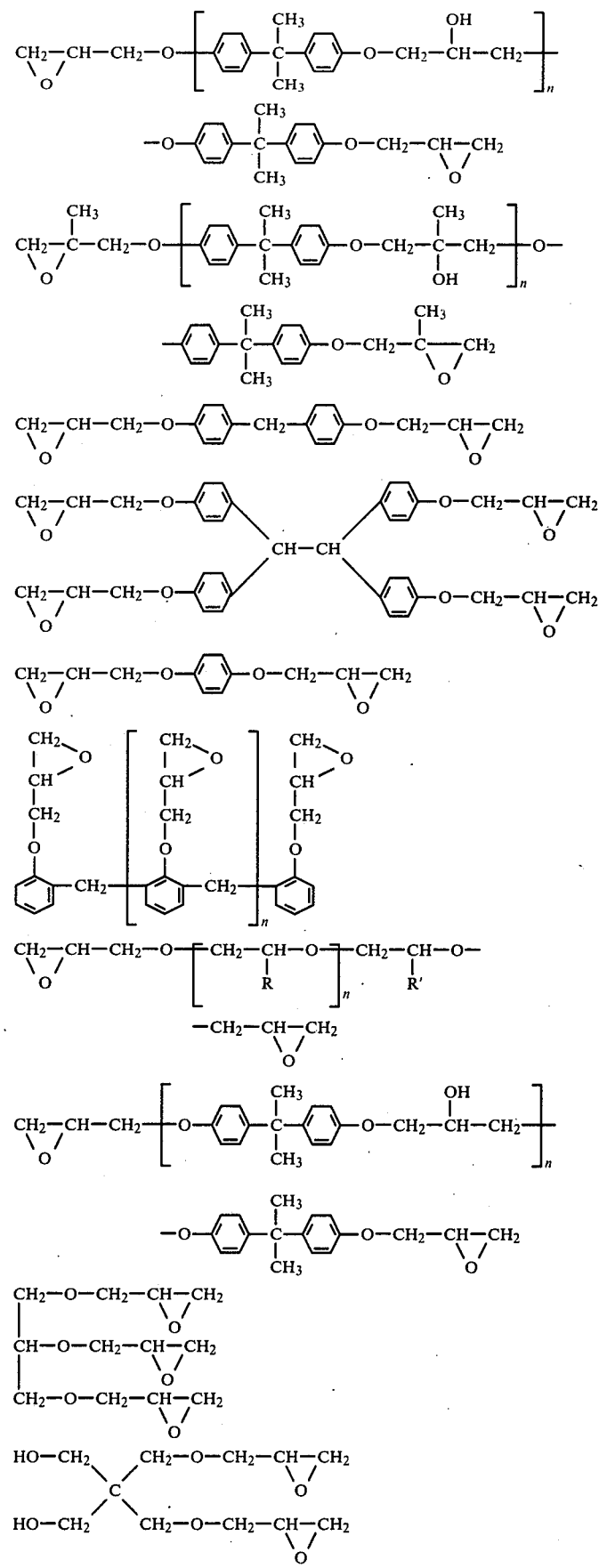

-continued
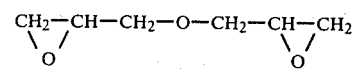
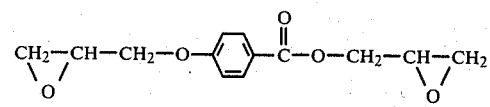
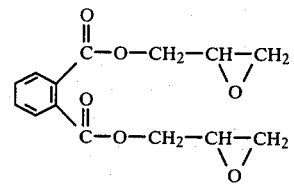
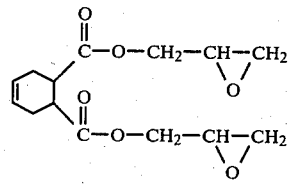
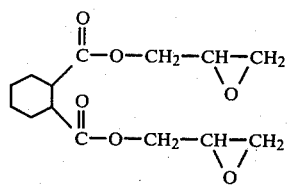
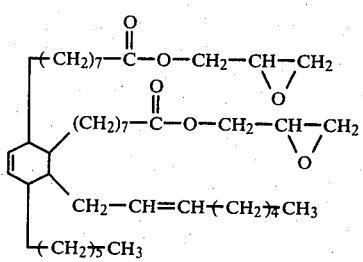
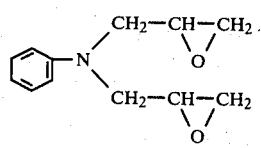
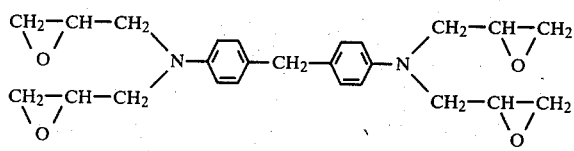
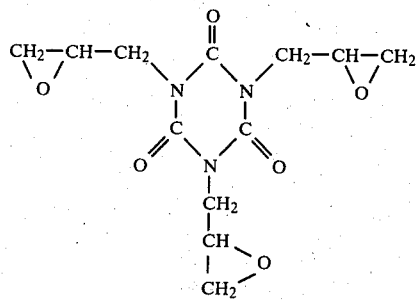
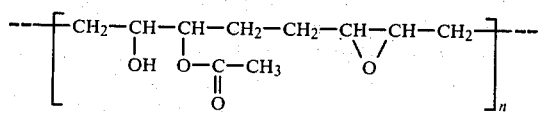

-continued

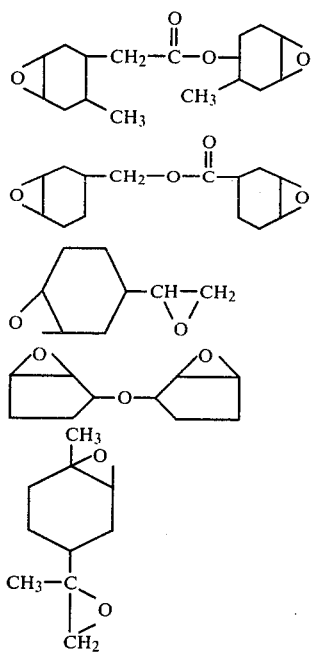

It is of course that the above exemplified epoxy compounds may be used either singly or as a combination of two kinds or more according to need.

In the next place, the component (b) in the inventive composition is a conventional curing agent for an epoxy resin composition. Examples of such a curing agent are amine compounds such as diethylene-triamine, triethylenetetramine, diethyllaminopropylamine, N-aminoethyl piperazine, bis(4-amino-3-methylcyclohexyl)methane, metaxylylene diamine, menthanediamine, 3,9-bis(3-aminopropyl)-2,4,8,10-tetraoxaspiro(5,5)undecane and the like, modified aliphatic polyamines such as adducts of an epoxy resin and diethylenetriamine, adducts of an amine and ethylene oxide, cyanoethylated polyamines and the like, phenol compounds and phenolic resins such as bisphenol A, trimethylolallyloxy phenol, low molecular weight phenolic resins expressed by the recurring of the units

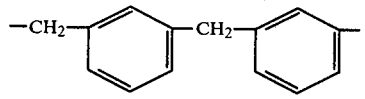

and epoxidated or butylated phenolic resins as well as phenolic prepolymer resins available commercially with various tradenames, amino resins including area resins commercially available with various tradenames, melamine resins and aniline resins, polysulfide resins having at least two mercapto groups in a molecule as expressed by the formula

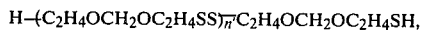

Where n' is an integer from 1 to 10, and organic acids or anhydrides thereof such as phthalic anhydide, hexahydrophthalic anhydride, tetrahydrophthalic anhydride, pyromellitic anhydride, methylnadic acid, dodecyl succinic anhydride, chlorendic anhydride and the like.

Among the above named classes of curing agents, the most preferred are aliphatic amine compounds in order that the cured products obtained with the inventive composition have excellent adhesivity, anti-alkali resistance and mechanical strengths. When the curing agent is a polysulfide resin, it is desirable to use a catalytic amount of diethylhydroxyamine or a guanidyl compound in combination therewith.

It is of course that the above named curing agents are used either singly or as a combination of two kinds or more according to the desired curing characteristics of the composition formulated therewith.

The amount of the component (b) to be formulated in the inventive composition is usually in the range from 1 to 50 parts by weight or, preferably, from 5 to 30 parts by weight per 100 parts by weight of the component (a). This is because that the inventive composition is cured not satisfactorily when the amount of the curing agent is smaller than 1 part by weight while an excessive amount of the curing agent over 50 parts by weight requires a correspondingly large amount of the undermentioned component (c) with an economical disadvantage in addition to the disadvantage that the component (a) as the main ingredient in the composition is unduly diluted taking a long time for curing and resulting in lowered properties of the cured products.

The component (c), which is an organosilicon compound having at least one silicon-bonded group represented by the general formula (I) or (II) above given, is the most characteristic ingredient in the inventive compositions and exhibits a very remarkable and unexpected effect of enhancing the storage stability of the composition markedly.

In the formula (I), the symbols $R^1$ and $R^2$ each stand for a hydrogen atom or a monovalent hydrocarbon group exemplified by alkyl groups such as methyl, ethyl and propyl groups, alkenyl groups such as vinyl and allyl groups, aryl groups such as phenyl group, cycloalkyl groups such as cyclohexyl group and aralkyl groups such as phenylethyl group as well as those groups obtained by replacing part or all of the hydrogen atoms in the above named hydrocarbon groups with substituent atoms or groups such as halogen atoms, cyano groups and the like.

In the formula (II), on the other hand, the symbol $R^3$ stands for a divalent hydrocarbon group exemplified by alkylene groups such as methylene, ethylene and propylene groups, arylene groups such as phenylene group and alkarylene groups such as phenethylene groups as well as those groups obtained by replacing part or all of the hydrogen atoms in the above named divalent hydrocarbon groups with substituent atoms or groups such as halogen atoms.

The organosilicon compounds suitable for use as the component (c) include a variety of compounds widely diversified in their molecular structures. A class of the organosilicon compounds includes organosilane compounds and organopolysiloxanes represented by the general formula.

$$R_a^4 X_b Y_c SiO_{\frac{4-a-b-c}{2}}$$

where $R^4$ is a monovalent hydrocarbon group, X is a group represented by the general formula (I) or (II) given above, Y is a hydrolyzable group such as alkoxy, acyloxy, amino, aminoxy, acido, oxime and ketoxime groups, a is zero or a positive number not exceeding 3, b is a positive number not exceeding 4 and c is zero or a positive number not exceeding 4 with the proviso that a+b+c does not exceed 4.

The organosilicon compounds of the component (c) belonging to the other class are linear silalkylene compounds represented by the general formula.

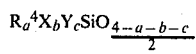

where $R^5$ is a monovalent hydrocarbon group, $R^6$ is a divalent hydrocarbon group, X has the same meaning as defined above, Z is a group of X or Y as defined above, d is zero, 1 or 2, e is 1, 2 or 3, f is zero, 1 or 2 and g is zero, 1 or 2 with the proviso that d+e=3 and f+g=2, and h is zero or a positive integer not exceeding 5.

Several of the examples of the organosilicon compounds in conformity with the definition of the component (c) in the invention are as follows.

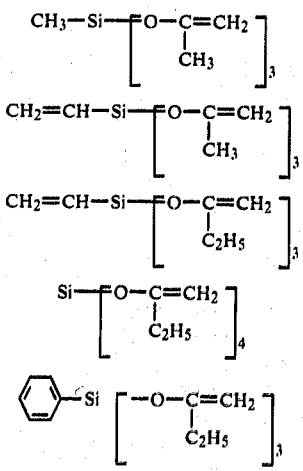

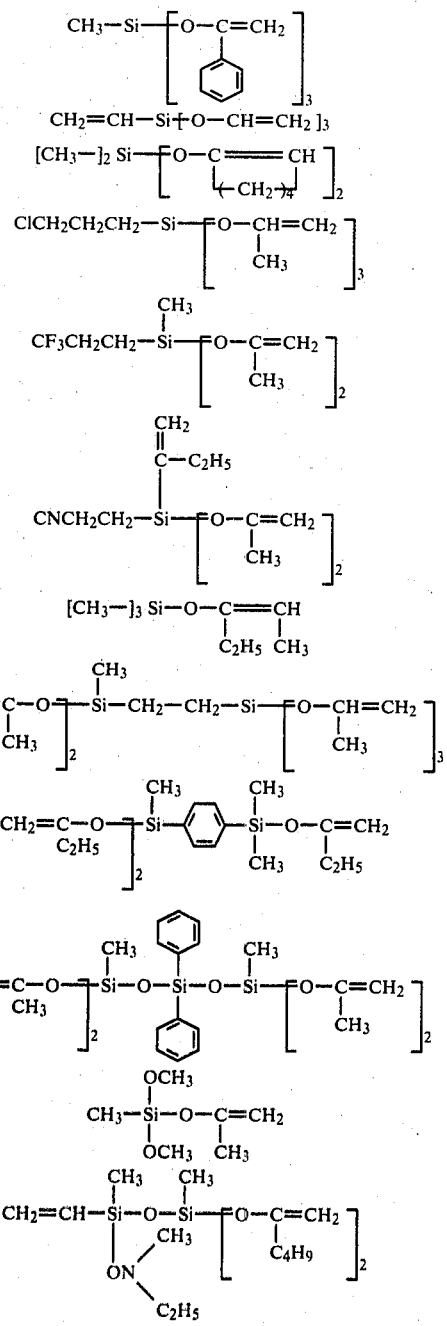

The organosilicon compounds as the component (c) can readily be synthesized by the dehydrochlorination condensation reaction between a halogen-containing organosilane or organopolysiloxane and a ketone or aldehyde compound in the presence of an organic amine compound or metallic sodium as an acid acceptor with, if necessary, the use of a catalyst such as zinc chloride.

As the ketone or aldehyde compound sed in the synthesis of the organosilic compound as the component (c) is preferred acetone or methylethylketone with a relatively low boiling point and inexpensiveness because the organosilicon compound derived therefrom is excellent in the reactivity with the active hydrogen in the component (b). On the other hand, an organosilicon compound having at least one phenyl group in a molecule as the component (c) is particularly preferable due to the very high mechanical strengths of the cured product obtained therewith.

The amount of the component (c) in the inventive composition is, although dependent to some extent on the content of hydroxy groups, if any, in the component (a) and the contents of the groups —NH$_2$, NH, —COOH and —NH—CO— in the component (b), usually about equimolar to the active hydrogen atoms in the component (b), i.e. the hydrogen atoms of the groups —NH$_2$, N—H, —COOH, —NH—CO— and the like. Owing to the close relationship between the chemical structures of the components (a) and (b) and the reactivity of them with the component (c), however, there may sometimes be cases where an amount of the component (c) smaller than equimolar to the active hydrogen is sufficient to exhibit the desired effects as is exemplified by the reaction shown by the reaction equation (ii) below. Accordingly, it is economically advantageous to adjust the amount of the component (c) in consideratio of the kinds or chemical structures of the components (a) and (b) in the range, say, from 1 to 2000 parts by weight or, preferably, from 10 to 160 parts by weight per 100 parts by weight of the component (a).

The organosilicon compound as the component (c) reacts, when blended with the component (b), exothermically with the active hydrogen atoms in the component (b) to produce the corresponding ketone compound or aldehyde compound. The reaction product of the components (b) and (c) formed by the liberation of the ketone or aldehyde compound is stable in an anhydrous condition.

The reaction between the components (b) and (c) is understood by the following reaction equations taking the cases where the component (b) is an amine or amide compound, in which the symbol Q stands for the group to which the active hydrogen atom to be protected is bonded such as —NH—, a nitrogen atom, N—CO— and the like and R$^1$, R$^2$ and R$^3$ each have the same meaning as defined before. These reactions can be accelerated by the presence of a catalytic amount of diethylhydroxyamine, a guanidine compound or an imidazole compound.

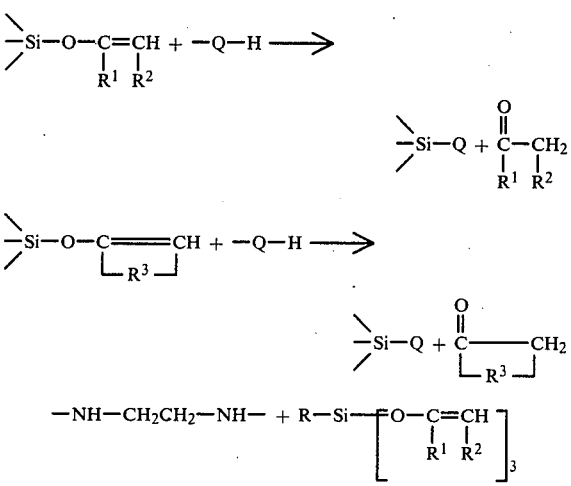

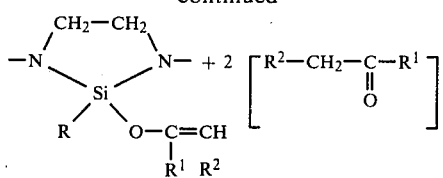

It is optional that the curable composition of the present invention contains certain additives usually formulated in conventional epoxy resin compositions such as diluents, fillers, pigments, dyestuffs, aging retarders, flame retardants, curing accelerators and leveling agents and the like according to need.

The diluents above mentioned may be either reactive or non-reactive and the reactive diluents are exemplified by allyl glycidyl ether, phenyl glycidyl ether, epichlorohydrine, styrene oxide, n-butyl glycidyl ether, octyleneoxide, propyleneoxide, 1,2-epoxy-dodecene and the like. Fillers suitable for use are exemplified by mica powder, powder of silica, pulverized quartz, bauxite, river sand, calcium carbonate, powder of slate, talc, glass wool, carbon black, polystyrene powder, polyethylene powder and the like. These fillers are used desirably after drying as completely as possible prior to admixing of them into the composition to be freed from any trace amounts of moisture which may adversely affect the stability of the composition.

The curable composition of the present invention is prepared by merely blending the components (a) to (c) uniformly together with the other additives, if desired, in an atmosphere of dry air or nitrogen. The composition is used, if necessary, as diluted with an inert organic solvents such as hydrocarbon solvents, e.g. benzene, toluene and xylene, ketone solvents, e.g. methylethylketone and methylisobutyl ketone, alcoholic solvents and ester solvents.

As is understood from the above description, the curable composition of the present invention is very stable and storable for a long period of time when kept in a sealed condition away from atmospheric moisture owing to the masking effect of the component (c) on the curing agent as the component (b) while it is readily cured even at room temperature when exposed to the atmospheric air to regenerate the curing agent by the action of the atmospheric moisture. Further, the composition of the present invention is curable on the surface of various kinds of substrate materials with strong adhesion. In particular, strong adhesion is obtained on the surface of various materials for building such as cured concrete, cured mortar, bricks, masonry, woods, glass and the like so that one of the most promising applications of the inventive curable compositions is in the use for adhesively bonding these building materials to various sealants such as silicone sealants, polysulfide sealants, polyurethane sealants and the like. Furthermore, the inventive composition can find wide applications in the fields of coating compositions, general-purpose adhesive agents and the like.

In the following, the curable compositions of the present invention are further described by way of examples, in which parts are all given by parts by weight. The organosilicon compounds as the component (c) in the inventive compositions used in the Examples were synthesized in the procedures given below.

Synthesis of methyltri(isopropenyloxy)silane. Into an autoclave of 2-liter capacity made of hard glass were introduced 100 g of benzene, 250 g (2.47 moles) of triethylamine, 232 g (4.0 moles) of acetone, 1.0 g of anhydrous zinc chloride and 120 g (0.8 mole) of methyltrichlorosilane to form a homogeneous reaction mixture, which was heated gradually up to 110° C. where agitation was continued for 16 hours. Formation of triethylamine hydrochloride began immediately upon heating and the amount of the salt increased to level off after 16 hours of heating. The pressure inside the autoclave dropped from 2.3 kg/cm$^2$G at the initial stage of the reaction to about 1.0 kg/cm$^2$G at the end of the above reaction time.

After cooling to room temperature, the reaction mixture was taken out of the autoclave and filtered in an atmosphere of dry nitrogen to remove 320 g of the triethylamine hydrochloride and the filtrate was twice distilled first under a pressure of 4 mmHg and then under a pressure of 20 mmHg to collect 83 g of a fraction boiling at 73° C. under 20 mmHg.

The above obtained fraction weighing 83 g was admixed with 8 g of active carbon and, after agitation for 4 hours at a temperature of 50° to 60° C., distilled again to give a reaction product having a refractive index $n_D^{25}$ of 1.4246. This compound was identified to be the objective methyltri (isopropenyloxy)silane from the analytical results of gas chromatography, infrared absorption spectroscopy and the elementary analysis for silicon.

Synthesis of phenyltris(1-ethylvinyloxy)silane. The reaction procedure was substantially the same as in the synthesis of methyltri(isopropenyloxy) silane above described and 100 g of benzene, 250 g (2.47 moles) of triethylamine, 308 g (4.0 moles) of methylethylketone, 1.0 g of anhydrous zinc chloride and 169 g (0.8 mole) of phenyltrichlorosilane were introduced into the same autoclave to carry out the reaction in a similar manner. A fraction weighing 110 g and boiling at 128° to 132° C. under a pressure of 3 mmHg was obtained by distillation.

The above obtained fraction weighing 110 g was admixed with 10 g of active carbon and, after agitation for 4 hours at a temperature of 50° to 60° C., distilled again to give 95 g of a reaction product boiling at 130° C. under a pressure of 3 mmHg. This compound was identified to be the objective phenyltris(1-ethylvinyloxy) silane from the analytical results of gas chromatography, infrared absorption spectroscopy and the elementary analysis for silicon.

Synthesis of 3-chloropropyltri(isopropenyloxy)silane. Into a mixture composed of 207 g of acetone, 220 g of triethylamine and 2 g of zinc chloride was added dropwise 116.8 g of 3-chloropropyl trichlorosilane and the resultant reaction mixture was heated under reflux for 30 hours followed by filtration and distillation to give a clear, colorless reaction product boiling at 110° C. under a pressure of 5 mmHg, which was identified to be the objective 3-chloropropyltri (isopropenyloxy)silane.

Synthesis of vinyl monomethoxydi(isopropenyloxy)silane. Into a flask of 1-liter capacity equipped with a stirrer, a refluxing condenser with a desicant tube, a thermometer and a dropping funnel was taken 113 g (0.5 mole) of vinyl triisopropenyloxysilane and then a mixture composed of 32 g (0.5 mole) of methyl alcohol and 2 g of diethylhydroxyamine was added dropwise thereinto through the dropping funnel over a period of 10 minutes followed by agitation for additional one hour while the temperature of the reaction mixture was kept at around room temperature by cooling from outside in compensation for the heat evolved by the reaction. The thus obtained reaction mixture was subjected to distillation to give 65 g of a clear, colorless reaction product which was identified to be the objective vinyl monomethoxydi(isopropenyloxy) silane.

EXAMPLE 1

A clear, viscous liquid composition was prepared by uniformly blending 100 parts of an epoxy resin having an average molecular weight of 380, epoxy equivalent of 186 and viscosity of 13,000 centistokes at 25° C. (Epikote 828, a product by Shell Chemical Co.), 10 parts of triethylenetetramine and 40 parts of methyltri (isopropenyloxy) silane. When these ingredients were admixed together, a slight temperature elevation of the mixture was observed.

The thus prepared liquid composition retained its fluidity almost unchanged when it was kept in a sealed condition over a period of one month or longer at room temperature but became rapidly cured on exposure to atmospheric air.

A comparative composition prepared with the same amounts of the same epoxy resin and triethylenetetramine as above but with omission of the silane compound became cured at room temperature within 4 hours even in a sealed condition.

A further comparative test was undertaken with a composition prepared with 100 parts of the same epoxy resin, 8 parts of triethylenetetramine, 40 parts of toluene, 40 parts of acetone, 40 parts of dioxane and 40 parts of vinyltrimethoxysilane, which was kept in a sealed condition at room temperature with gradual loss of its fluidity after 24 hours from preparation to be converted into a cured body.

EXAMPLE 2

A clear, viscous liquid composition was prepared by uniformly blending 100 parts of an epoxy resin having an average molecular weight of about 900, epoxy equivalent of 470 and melting point of 67° C. (Epikote 1001, a product by Shell Chemical Co.), 15 parts of diethylenetriamine and 50 parts of vinyltri (isopropenyloxy) silane. This composition was stable at room temperature over a period of one month or longer when kept in a sealed condition but rapidly cured on exposure to atmospheric air within 24 hours to be converted into a cured body insoluble in organic solvents such as toluene, ether and acetone.

A comparative composition prepared with the same amounts of the same epoxy resin and diethylenetriamine but with omission of the silane compound was kept in a sealed condition at 20° C. Gelling of the composition began after 2 hours from preparation to be gradually converted into an insoluble cured body.

EXAMPLE 3

A viscous liquid composition was prepared by uniformly blending 100 parts of an epoxy resin having an average molecular weight of 330, epoxy equivalent of 183 and viscosity of 900 centistokes at 25° C. (GY-252, a product by Ciba Geigy Co.), 30 parts of talc, 20 parts of 1,4-cyclohexane bismethylamine and 60 parts of phenyltri (isopropenyloxy) silane. This composition was stable at room temperature for a period of one month or longer when kept in a sealed condition but rapidly cured on exposure to atmospheric air.

A comparative composition was prepared with the same amounts of the same ingredients as above but with the omission of phenyltri (isopropenyloxy) silane and kept in a sealed condition at room temperature to be cured into a cured body within 24 hours.

EXAMPLE 4

A clear, viscous liquid composition was prepared by uniformly blending 100 parts of the same epoxy resin as used in Example 1. 20 parts of an epoxy resin having an epoxy equivalent of 156 and a viscosity of 23,000 centistokes at 25° C. (a product by Union Carbide Corp.) and 10 parts of Adecasider O-130P having a viscosity of 300 centistokes at 30° C. and containing 6.8% by weight of an epoxy-containing organosilane compound (a product by Adeca Argus Co.) followed by further admixing of 30 parts of m-xylylenediamine and 100 parts of phenyltris (1-ethylvinyloxy) silane. This composition was stable at room temperature for a period of one month or longer when kept in a sealed condition but rapidly cured on exposure to atmospheric air.

EXAMPLE 5

A composition was prepared by uniformly blending 100 parts of tetrahydrophthalic acid diglycidyl ether, 50 parts of triglycidylisocyanurate and 10 parts of vinyl cyclohexene diepoxide followed by further admixing of 20 parts of tetraethylenepentamine and 150 parts of 3-chloropropyl tri (isopropenyloxy) silane. This composition was stable at room temperature for a period of 3 months or longer when kept in a sealed condition but was curable on exposure to atmospheric air within 3 days to be converted into a cured body insoluble in organic solvents such as toluene.

EXAMPLE 6

Adhesive bonding tests were undertaken with the curable compositions prepared in Examples 1 to 5 above described, in which two kinds of room temperature-curable silicone rubber compostitions were bonded to several kinds of substrate materials with either one of the inventive epoxy resin compositions as the primer. The formulations of the silicone rubber compositions (hereinafter referred to as RTV-1 and RTV-2) were as follows.

Preparation of RTV-1. A blend composed of 85 parts of a dimethylpolysiloxane terminated at both chain ends with hydroxy groups and having a viscosity of 22,000 centistokes at 25° C., 15 parts of a fumed silica having a specific surface area of 300 m²/g and 0.1 part of dibutyltin dilaurate was kneaded by passing once through a three-roller mill followed by further admixing of 8 parts of methyltris (methylethylketoximate) silane and 0.3 part of 3-aminopropyltriethoxysilane in an atmosphere of nitrogen gas and degassing treatment. The composition was storable as such in one package when kept in a sealed condition but was curable on exposure to atmospheric air.

Preparation of RTV-2. This silicone rubber composition was of the so-called two-package type storable in two packages of a base mixture not curable as such and a second mixture serving as the curing agent. The base mixture was prepared by blending 60 parts of a dimethylpolysiloxane terminated at both chain ends with hydroxy groups and having a viscosity of 5000 centistokes at 25° C. and 40 parts of a calcium carbonate filler followed by passing of the mixture once through a three-roller mill. The second mixture was prepared by blending 95 parts of a cyclic organopolysiloxane expressed by the structural formula

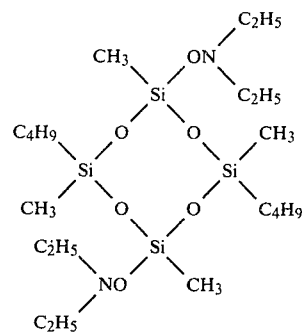

and 5 parts of another cyclic organopolysiloxane expressed by the structural formula

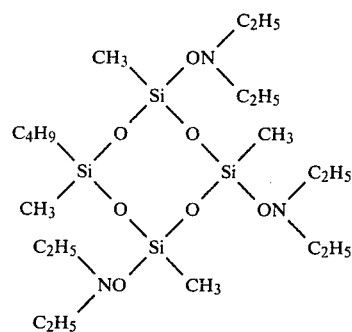

A curable silicone rubber composition designated as RTV-2 was obtained by uniformly mixing 100 parts of the base mixture and 2.5 parts of the second mixture.

The testing procedure for adhesive bonding was basically in accordance with the method specified in Article 6.11.3 of JIS A 5757 and the test panels of cured mortar plates, wood boards of lauan or slate boards were first coated with either one of the epoxy resin compositions prepared in the Examples 1 to 5 in a coating amount of 300 g/m² by brushing and dried for 1 hour at 20° C. A pair of the thus primer-treated test panels was bonded together by sandwiching RTV-1 or RTV-2 according to the JIS method to give test specimens.

Determination of the mechanical properties of these test specimens was undertaken with the specimens as prepared and the specimens after immersion in water at 20° C. for 14 days. The results obtained are set out in Table 1 below.

For comparison, the same tests were repeated with the same test panels and with the same RTV-1 or RTV-2 but without the use of the inventive epoxy resin compositions as a primer to give the results also set out in Table 1.

EXAMPLE 7

Adhesive bonding tests of the room temperature-curable silicone rubber composition RTV-1 and RTV-2 prepared in Example 6 to a pre-cast concrete panel were undertaken with or without the use of the curable composition prepared in Example 4 as the primer.

The testing procedure was substantially the same as specified in Article 5.5 of JIS A 5755. Thus, the curable composition prepared in Example 4 was applied on to the surface of the pre-cast concrete panel in a coating amount of 200 g/m² and dried for 1 hour in an atmosphere of 60% relative humidity at 20° C. The adhesive bonding of RTV-1 or RTV-2 applied on the thus-primed surface was tested by peeling after curing for 7 days in an atmosphere of 60% relative humidity at 20° C. to show that the adhesion was complete for both of RTV-1 and RTV-2 while the adhesive bonding was very poor when the composition of Example 4 was not used as the primer.

What is claimed is:

1. A room temperature-curable epoxy resin composition which comprises
   (a) an epoxy compound having at least two epoxy groups in a molecule,
   (b) a curing agent, and
   (c) an organosilicon compound having, in a molecule, at least one group represented by the general formula

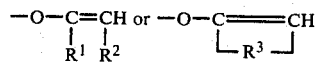

wherein $R^1$ and $R^2$ are each a hydrogen atom or a monovalent hydrocarbon group and $R^3$ is a divalent hydrocarbon group, directly bonded to the silicon atom.

2. The resin composition as claimed in claim 1 wherein the amount of the curing agent is in the range from 1 to 50 parts by weight per 100 parts by weight of the epoxy compound.

3. The resin composition as claimed in claim 1 wherein the organosilicon compound is an organosilane compound or an organopolysiloxane represented by the general formula

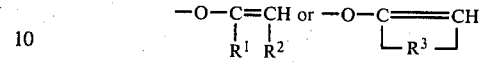

where $R^4$ is a monovalent hydrocarbon group, X is a group represented by the general formula $$-O-C=CH \text{ or } -O-C\equiv\!\equiv\!\equiv CH$$
$$\quad\quad |\ \ \ |\quad\quad\quad\quad\quad\ \ \lfloor R^3 \rfloor$$
$$\quad R^1\ R^2$$

where $R^1$, $R^2$ and $R^3$ each have the same meaning as defined above, Y is a hydrolyzable group, a is zero or a positive number not exceeding 3, b is a positive number not exceeding 4 and c is zero or a positive number not exceeding 4 with the proviso that $a+b+c$ does not exceed 4.

4. The resin composition as claimed in claim 1 wherein the amounts of the organosilicon compound is in the range from 1 to 200 parts by weight per 100 parts by weight of the epoxy compound.

5. The resin composition as claimed in claim 1 wherein the organosilicon compound is selected from the group consisting of methyltri (isopropenyloxy) silane, phenyltris (1-ethylvinyloxy) silane, 3-chloropropyltri (isopropenyloxy) silane and vinyl monomethoxydi (isopropenyloxy) silane.

6. The resin composition of claim 1 wherein the epoxy compound is selected from the group consisting of glycidyl ether compounds, glycidyl ether ester compounds, glycidyl amine compounds, linear aliphatic epoxy compounds, and alicyclic epoxy compounds.

7. The resin composition of claim 6 wherein the epoxy compound is selected from the group consisting of glycidyl ether compounds, glycidyl ester compounds and glycidyl amine compounds.

* * * * *